United States Patent

[11] 3,549,103

| [72] | Inventor | Thomas F. Sarah<br>Akron, Ohio |
|---|---|---|
| [21] | Appl. No. | 725,286 |
| [22] | Filed | Apr. 30, 1968 |
| [45] | Patented | Dec. 22, 1970 |
| [73] | Assignee | Shakespeare Company<br>Kalamazoo, Mich.<br>a corporation of Delaware. by mesne assignment |

[54] ANTIBACKLASH BRAKE MEANS FOR FISHING REELS
4 Claims, 5 Drawing Figs.

[52] U.S. Cl............................................. 242/84.5,
188/187
[51] Int. Cl.............................................. A01k 89/02
[50] Field of Search........................................ 242/84.52,
84.54, 84.44, 84.45, 84.46, 84.5, 84.5A, 84.51,
84.51A; 188/187

[56] References Cited
UNITED STATES PATENTS

| 2,329,381 | 9/1943 | Bannister .................. | 242/84.44 |
| 2,344,209 | 3/1944 | Lowe.......................... | 242/84.51(A) |
| 2,760,357 | 8/1956 | Burns .......................... | 242/84.45X |
| 3,097,814 | 7/1963 | Sarah .......................... | 242/84.54 |
| 3,367,598 | 2/1968 | Harrington et al............ | 242/84.52 |
| 3,448,942 | 6/1969 | Parks........................... | 242/84.54 |

Primary Examiner—Billy S. Taylor
Attorney—Hamilton, Cook, Renner and Kenner

ABSTRACT: A brake mechanism for precluding backlash in fishing reels. A friction face rotatable with the line spool is engaged, through a film of fluid, by a reaction pad. The reaction pad is forced into this engagement with the friction face by a gland that compresses a resilient annulus, interposed between the gland and the reaction pad, against the latter. The gland is rotatable with, and displaceable axially with respect to, a control knob that is, in operative position, axially fixed with respect to the reel. A detent means marks rotation of the control knob into incremental units, and selective rotation of the knob moves the gland axially, on thread means, to adjust the compression of the resilient annulus and thus the pressure applied by the resilient annulus in forcing the reaction pad against the friction face. A spring means acting between the control knob and the gland eliminates mechanical backlash in the thread means on which the gland moves. A reservoir means provides fluid for the film required between the friction face and the reaction pad.

INVENTOR.
THOMAS F. SARAH
BY Hamilton Cook,
Renner & Renner
ATTORNEYS

INVENTOR
THOMAS F. SARAH
BY Hamilton, Cook,
Renner & Kenner
ATTORNEYS

ANTIBACKLASH BRAKE MEANS FOR FISHING REELS

BACKGROUND OF THE INVENTION

The present invention relates to fishing reels and more particularly to a brake mechanism adapted to prevent backlash in a casing type reel.

Backlash occurs when the line spool revolves faster than the line is being removed therefrom, a situation that is most likely to occur near the end of the cast. As the lure nears the end of its trajectory and begins markedly to slow, the inertia of the spool causes it to continue to rotate, and, if this tendency is not curbed, the spool will revolve at a rate faster than that required by the line actually being drawn out of the reel by the lure. This differential rate of speed causes the outer wraps of line on the spool to be thrown radially outwardly, to overlap and to tangle in the classic backlash. Experienced fishermen guard against backlash by "thumbing" the spool i.e., they apply a controlled pressure against one of the spool flanges so as to synchronize the rotational speed of the spool to the withdrawal of the line. However, proper thumbing of the spool requires great skill and constant practice. For this reason numerous mechanical configurations have been devised as attempted substitutes for the experienced angler's thumbing action, but most have provided only moderate success.

The greater number of prior known antibacklash devices have merely applied a constant drag against spool rotation, thus also effectively reducing the length of the cast that can be made. Other prior known constructions have attempted to relate the amount of drag to the rotational speed of the spool, but most constructions of this nature inherently apply more drag when the rotational speed of the spool is the greatest. Accordingly, the greatest drag is applied at the beginning of the cast with progressively lesser drag being applied thereafter—just the opposite to the most desirable application of braking action. With this type of antibacklash construction any success has therefore been to the detriment of the casting characteristics of the reel in which it was incorporated.

The most advantageous antibacklash device is one whereby little, or no, drag is applied during the initial portion of the cast but a greater amount of drag is applied near the end of the cast. As an optimum, the amount of resistance applied to the rotation of the spool should be an inverse function of the spool's speed. Such a result is best obtained by the use of a film of fluid between two relatively rotatable drag surfaces operatively connected between the spool and the reel frame. This construction is analogous to the braking of the vehicle on a smooth, wet, road surface—at high speeds the wet surface acts as a lubricant and the tires (even though locked against rotation) slide easily along the road without appreciable speed reduction, but at low speeds the tires wipe away the film of fluid and frictionally engage the road surface with marked speed reduction.

Only one prior known construction employs this broad concept. This prior known construction employs a braking surface mounted on one end of the line spool shaft which rotates with the spool. A contacting surface is provided on a rotationally stationary but axially movable reaction disc that engages the rotatable braking surface mounted on the spool shaft. One of these engaging surfaces is made of a plastic material and the other of metal. A film of fluid, preferably oil, is provided between the relatively rotatable engaging surfaces from a felt reservoir positioned adjacent the reaction disc but on the side opposite to that which engages the rotatable braking surface. A compression spring bears directly against the felt reservoir to bias, in turn, the reaction disc against the braking surface on the spool shaft. A simple cap is adjustable axially of, and engages the opposite end of, the compression spring in an attempt to regulate the pressure applied by the disc against the braking surface on the spool shaft.

This construction, though eminently more successful than other prior art concepts, does have several drawbacks. First, the direct engagement of the felt reservoir by the end of the compression spring severely reduces the effective life of the reservoir. Second, it is nearly impossible accurately to adjust the antibacklash resistance required for lures of various weights and for varied casting conditions. Third, the position of the simple cap can be inadvertently changed if the fisherman palms the reel during the retrieve.

SUMMARY OF THE INVENTION

It is therefore a primary object of the present invention to provide an effective antibacklash, brake mechanism for a casting reel.

It is another object of the present invention to provide a brake mechanism, as above, which utilizes a film of fluid to preclude rotational drag on the line storing spool during the initial portion of the cast and increase the drag near the end of the cast.

It is still another object of the present invention to provide a brake mechanism, as above, in which the fluid reservoir is not subjected to excessive wear and is readily maintained in its proper position.

It is yet another object of the present invention to provide a brake mechanism, as above, which can be adjusted in accurately fine increments.

It is a further object of the present invention to provide a brake mechanism, as above, the adjustment of which is not readily subject to inadvertent change, even if the reel is palmed during retrieve.

It is a still further object of the present invention to provide a brake mechanism, as above, which is economical to manufacture and durable in use.

These and other objects of the present invention, as well as the advantages thereof over existing and prior art forms, will be apparent in view of the following detailed description of the attached drawings and are accomplished by means hereinafter described and claimed.

In general, a brake mechanism embodying the concept of the present invention provides a frictional resistance to the rotation of the line spool in a bait casting reel that varies inversely to the rotational speed of the spool and thereby possesses excellent antibacklash characteristics. A friction face mounted for rotation with the line spool is engaged by a reaction pad movably mounted in the frame so as to apply selective pressure against the friction face. A thin film of liquid is provided between the friction face and the reaction pad. A selectively positionable gland is mounted in the frame for movement in a first direction—in the preferred embodiment, axially. A resilient annulus is positioned between the gland and the reaction pad and is selectively compressible in response to controlled movement of the gland in the first direction to bias the reaction pad against the friction face.

The gland is connected to a control knob, located exteriorly of the reel frame, by a sliding connection. In this way movement of the knob in a second direction—in the preferred embodiment rotationally—displaces the gland in the first direction even though the control knob is restricted, in its operative position, against movement in the first direction. A spring means continually biases the gland in a direction away from the resilient annulus, and a detent means provides for accurate incremental movement of the control knob in the second direction.

One preferred embodiment of the subject brake mechanism is shown by way of example in the accompanying drawings and is described in detail without attempting to show all of the various forms and modifications in which the invention might be embodied; the invention being measured by the appended claims and not by the details of the specification.

DESCRIPTION OF A PREFERRED EMBODIMENT

Figure 1:
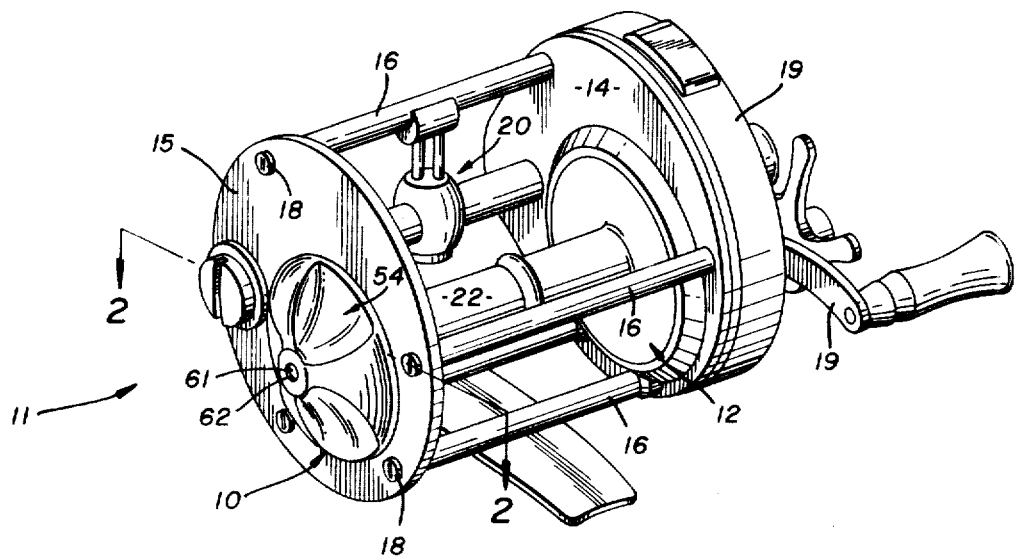
FIG. 1 is a perspective view of a bait casting reel embodying the concept of the subject antibacklash brake mechanism.

Referring more particularly to the drawings, the improved antibacklash assembly, indicated generally by the numeral 10, is disclosed in conjunction with a bait casting reel 11. Bait casting reels 11 are conventionally supplied with a line spool 12 fixed on a spool shaft 13 that is journaled between head and tail plates 14 and 15, respectively. The head and tail plates 14 and 15 are, in turn, joined together in spaced relation by a plurality of pillars 16 to form the reel frame. A plurality of pillar screws 18 secure the plates to the pillars.

A crank 19 is operatively connected to rotate the line spool 12 by a conventional gear train (not shown) housed between the head plate 14 and a cap 19. Specifically, the gear train connects between the crank 19 and that end of the spool shaft 13 journaled in the head plate 14. The gear train is also preferably connected to operate a level wind mechanism, indicated generally by the numeral 20.

The prior art discloses the application of a wide variety of braking devices to the spool shaft in conventional bait casting reels, as heretofore described. The subject antibacklash assembly also applies a braking action to that end of the spool shaft 13 journaled in the tail plate 15.

Figure 2:
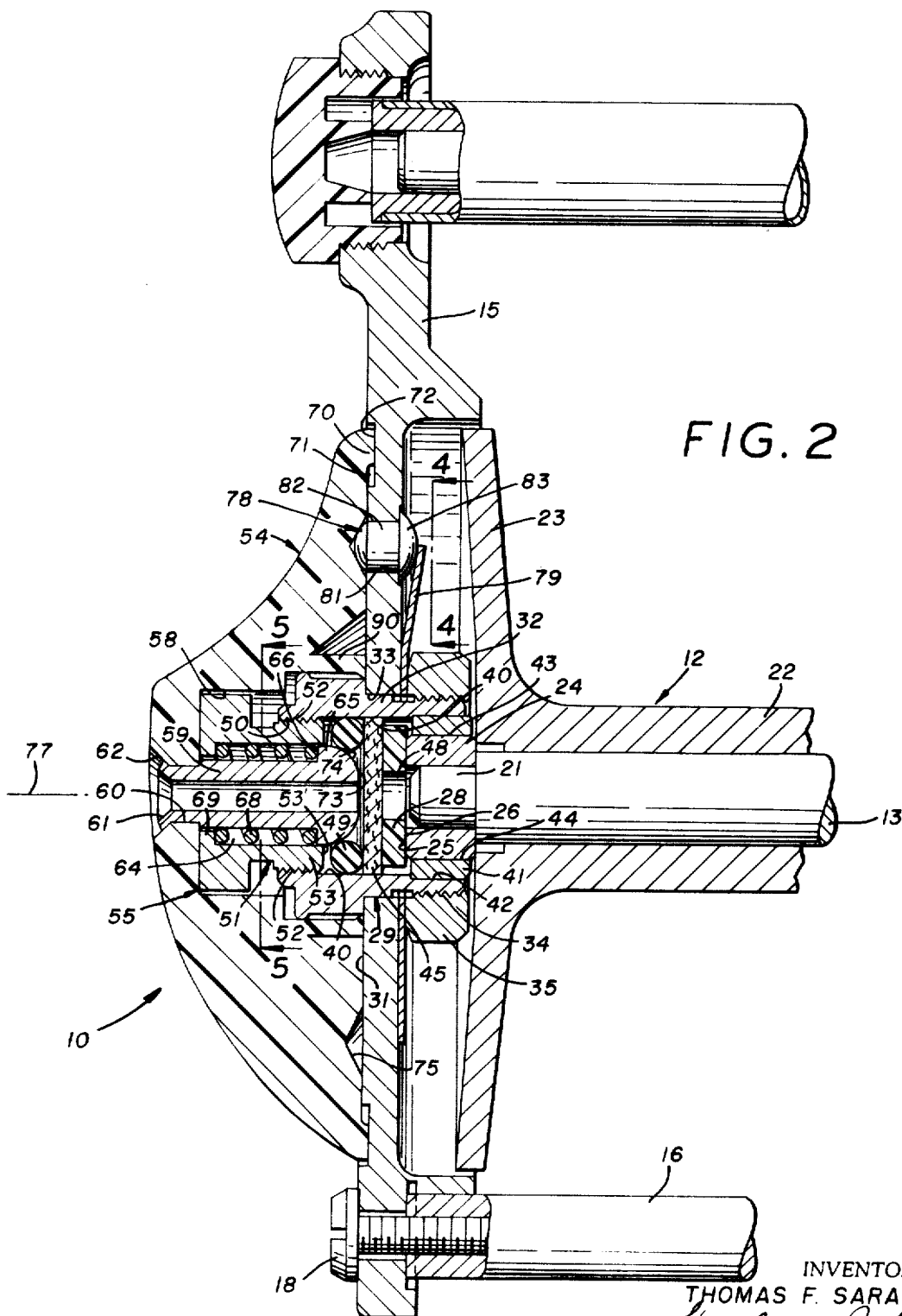
FIG. 2 is an enlarged partial cross section taken substantially on line 2—2 of FIG. 1.
Figure 3:
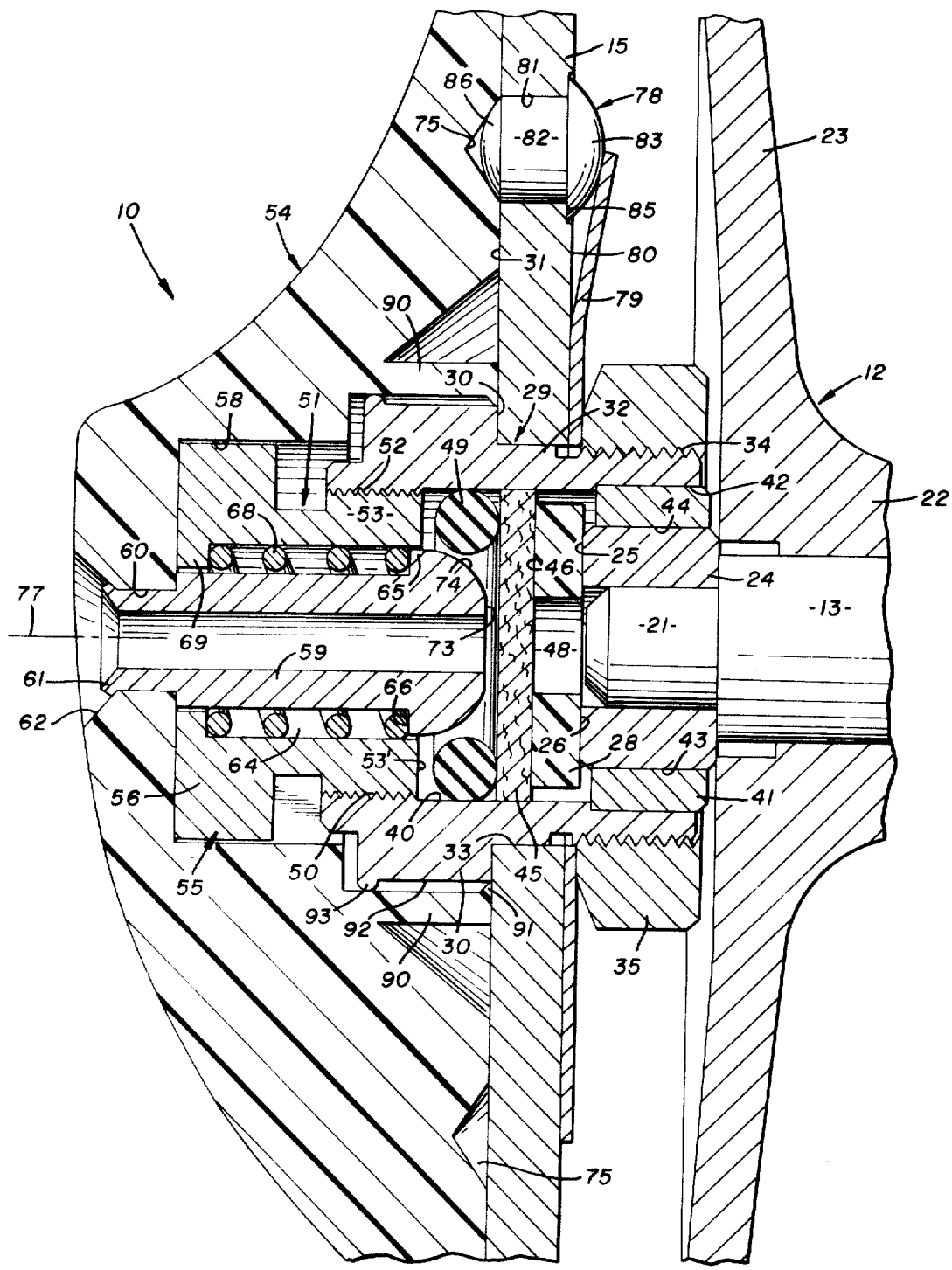
FIG. 3 is a further enlarged partial area of FIG. 2.

As best seen in FIGS. 2 and 3, the shaft 13, which is nonrotatably press fit within the hub 22 of spool 12 presents a stud 21 that extends axially beyond the spool flange 23 positioned adjacent the tail plate 15. A combined journal and brake collar 24 is, in turn, fixed on the stud 21, as by the press fit depicted. The friction face 25, oriented transversely the axis of shaft 13, on collar 24 is thus rotatable with the line spool 12 and is engaged by an opposed contact face 26 on a reaction pad 28.

The reaction pad is mounted within a bushing 29 secured to and through the tail plate 15. A radially directed shoulder 30 in proximity to, and extending from, one end of the bushing 29 engages the axially outer face 31 of the tail plate 15, and the body portion 32 of bushing 29 extends through a bore 33 in the tail plate 15. The radially outer surface of the body portion 32 is threaded, at 34, to receive a mounting nut 35 by which the bushing 29 is fixedly secured to the tail plate 15.

A bore defined by a cylindrical wall 40 extends axially through the bushing 29. A sleeve bearing 41 is pressed into the axially inner, enlarged portion 42 of the bore 40 and rotatably receives the journal and brake collar 24. That is, the radially outer, peripheral journal surface 43 on collar 24 rotatably engages the radially inner, annular bearing surface 44 of the sleeve bearing 41.

The friction face 25 on collar 24 is preferably located axially beyond the sleeve bearing 41 to permit unrestricted engagement with the contact face 26 on reaction pad 28.

A reservoir disc 45 is juxtaposed against the axially outer face 46 of the reaction pad 28. It has been found that a material such as felt makes an excellent reservoir disc. A flow passage 48, extending axially through the reaction pad 28, permits fluid to communicate from the reservoir disc 45 through the reaction pad 28 to the relatively rotatable friction face 25 on collar 24 and the contact face 26 on the reaction pad 28, as will be more fully hereinafter explained.

A resilient annulus 49, such as an O-ring, is positioned against the reservoir disc 45. The diameter of annulus 49 is such that it lies adjacent the cylindrical wall 40 of the bore through bushing 29. Axially outwardly of the annulus 49 the bore wall 40 is provided with raised threads 50. A gland, indicated generally by the numeral 51, has threads 52 on the radially outer surface of the follower portion 53 which intermesh with the raised threads 50. The axially inner end of the follower portion 53 forms a compressing face 53′ engageable with the resilient annulus 49.

Figure 5:
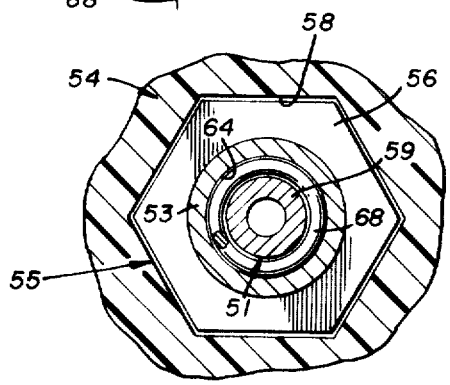
FIG. 5 is a further partial cross section taken substantially on line 5—5 of FIG. 2.

The gland 51 is joined to a control knob 54 by a sliding connection, indicated generally by the numeral 55. In the preferred embodiment depicted, and as best seen in FIG. 5, a key 56 in the form of a hexagonal flange extends radially outwardly of the follower portion 53 and is received in a corresponding hexagonal recess 58 in the control knob 54. As such, the gland 51 is movable axially with respect to the control knob 54.

Centrally of the recess 58, a tubular duct 59 extends outwardly through a passage 60 in the control knob 54 and opens for access exteriorly of the reel. The outermost end of the duct 59 flares to a conical throat 61 that anchors against a corresponding conical depression 62 and the axially outer face 63 of the control knob 54. With the throat 61 seated within depression 62 the duct 59 is fixed against axially inward displacements. From the throat 61 the duct 59 extends axially inwardly through a chamber 64 within the gland 51 and terminates in a radially extending foot portion 65. The axially outer side of the foot portion 65 presents a radially oriented shoulder 66 against which a compression spring 68 may bear. The spring 68 encircles the duct 59 and extends between the radially outwardly directed shoulder 66 on the foot portion 65 of duct 59 and a radially inwardly directed shoulder 69 on gland 51 that defines the axially outer wall of a spring receiving chamber 64. The compression spring 68 biases the gland axially outwardly with respect to the duct 59 and control knob 54.

The control knob 54 is of considerably larger diameter than the standard brake knob. For example, whereas the standard knobs are generally on the order of three-eighths inch in diameter, knob 54 is preferably on the order of 1⅜ inches in diameter. The relatively large diameter of the control knob 54, as compared to standard prior art constructions, contributes to the provision of accurate control over the braking action, as will hereinafter become apparent.

An annular locating flange 70 (FIG. 2) extends axially inwardly from the perimeter of the control knob 54 and is rotatably received within a corresponding annular, recessed slideway 71. The locating flange 70 slidingly engages the radially oriented base surface 72 of the slideway 71 to fix the axially inward extent to which the control knob 54 may be moved.

Thus, when the threads 52 on the follower portion 53 of gland 51 are screwed into the raised threads 50 in the bore 40 through the interior of bushing 29, the control knob 54 will move axially inwardly with the gland 51 until the locating flange 70 bottoms against the base 72 of slideway 71. In this position the radially oriented face 73 on the axially inner side of the foot portion 65 of duct 59 is juxtaposed to the reservoir disc 45. The duct 59 opens through face 73 so that fluid, such as oil, admitted from the throat 61, will flow through the duct 59 and be absorbed into the reservoir disc 45.

The radially outer extent of the face 73 joins a radially extending, conical chamfer 74 which curves axially outwardly to clear the resilient annulus 49. With the parts so assembled, selected rotation of the control knob 54 will, by the action of sliding connection 55, cause the gland 51 to be screwed axially inwardly of the bushing 29 even though the control knob is precluded from further axially inward movement by the engagement of the locating flange 70 against the base surface 72 of slideway 71. Axially inward movement of the gland 51, against the outwardly biasing action of spring 68, forces the compressing face 53′ on the follower portion 53 of gland 51 into engagement with the resilient annulus 49. The pressure applied by the compressing face 53′ to the annulus 49, in turn, compresses the reservoir disc 45 against the reaction pad 28 and the reaction pad against the collar 24. This compression of reservoir 45 also assures that some of the fluid held therein will seep through the flow passage 48 in the reaction pad 28 to moisten the engaging friction face 25 on the collar 24 and contact face 26 on the reaction pad 28.

Figure 4:
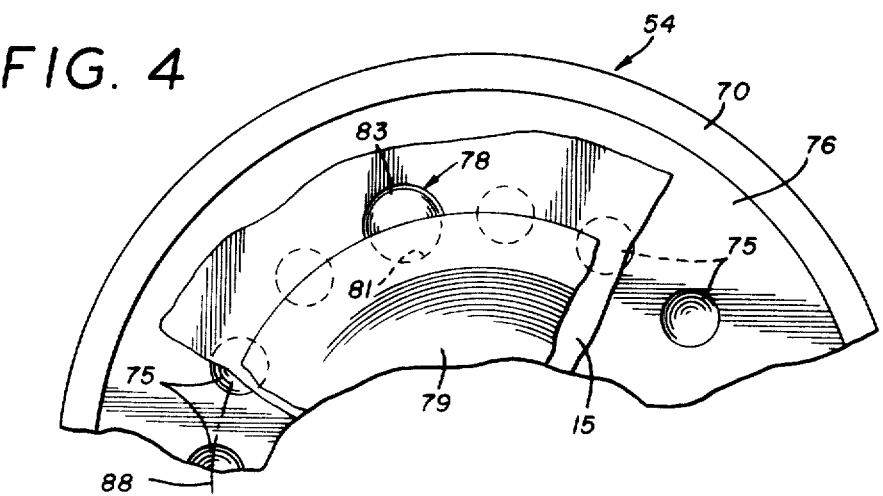
FIG. 4 is an enlarged internal elevation, partly broken away, of a portion of that area indicated generally by line 4—4 of FIG. 2.

In order to provide accurate control over the engaging pressure of the contact face 26 against the friction face 25 a plurality of detents 75 (FIG. 4) are located annularly around the axially inner surface 76 of the control knob 54. These detents 75 are interengageable with a spring plunger 78 mounted on the tail plate 15. As shown in FIGS. 2, 3 and 4, a resilient plate 79 may be clamped against the axially inner face 80 of the tail plate 15 by the same mounting nut 35 that secures the bushing 29 to the tail plate.

A bore 81 through the tail plate 15 receives the shaft portion 82 of plunger 78. A head 83 is provided on the axially inner end of the plunger 78 that extends radially from the shaft portion 82 and engages a recessed wall 85 in the axially inner face 80 of the tail plate 15 to retain the plunger 78 within the bore 81. The axially outer end of the plunger 78 is rounded, as at 86, smoothly to seat within the conical detents 75.

Because the control knob 54 is of relatively large diameter, the detent circle 88 may have a radius sufficient to displace the detents 75 outwardly of the rotational axis 77 of the gland 51 (also the rotational axis of knob 54) to accommodate a large number of detents circumferentially spaced in close proximity. As such, the gland 51 may be moved a predetermined incremental distance axially for each click of the plunger 78 as it moves to successive detents 75.

It should also be noted that because of the biasing action of the spring 68 there is no backlash between the threads 50 and 52 so that rotation of the control knob 54 in either direction will selectively displace the gland a predetermined axial distance in or out.

By making one of the relatively rotatable faces 25 and 26 of metal and the other of a plastic material such as Teflon, technically polytetrafluoroethylene, it has been demonstrated by the prior art that this film of oil, or the like, therebetween will not inhibit relatively high speed rotation but will inhibit relatively low speed rotation. It has been further found that the greater the magnitude of the engaging pressure between the faces 25 and 26, the greater the range of rotational speed that is inhibited by that engagement. These characteristics make this construction eminently suitable as an antibacklash device. One need only adjust the engaging pressure between the faces 25 and 26 for the particular lure weight and casting conditions. During the initial forward cast, when the lure is withdrawing line at the greatest rate, the spool is rotating to pay out line at its greatest speed and it is not desirable to retard rotation since that would detract from the cast. However, as the speed of the lure slows in flight, and as the rotation of the spool also slows, braking action is desirable, and, in fact, required to preclude backlash.

It is most desirable to adjust the braking action so that it slows the spool rotation commensurately with the slowing of the lure as it traverses its trajectory. Thus, as the lure finally plops into the water the spool should be braked to a stop. This balance, though delicate, can be achieved with the subject concept because of the accurate, incremental adjustment available. Moreover, by using a resilient annulus 49 to compress the reaction pad 28 against the collar 24 rather than a compression spring, as is done in the prior art, not only is more critical adjustment possible but the felt reservoir disc 45 is also less prone to deterioration. At the same time, the fixed axial location of the face 72 on the foot portion 65 of duct 59 in juxtaposition with the reservoir disc 45 provided by the subject construction assists in maintaining the reservoir disc 45 in a plane adjacent the reaction pad 28 and does not allow it to withdraw therefrom, as do prior art constructions.

The fixed location of chamfer 74 similarly assists in maintaining the resilient annulus 49 in its desired geometric configuration.

Referring again to FIGS. 2 and 3, it has been found desirable to restrict movement of the control knob 54 even if the threads 52 on gland 51 completely unmesh from the threads 50 of bushing 29. To this end a resilient, annular skirt 90 terminating in a radially inwardly directed lip 91 is provided on knob 54. The lip 91 slidingly engages the radially outer surface 92 on the shoulder 30 of bushing 29, and an opposed lip 93 on the axially outer extremity of the shoulder 30 engages the lip 91 to prevent the knob 54 from being lost. Yet, because the skirt 90 is resilient, the knob 54 can be snapped off, if desired.

Accordingly, a brake mechanism constructed according to the concept of the present invention is capable of critically fine adjustment to preclude backlash and otherwise accomplishes the objects of the invention.

I claim:

1. A brake mechanism for a fishing reel having a frame with a line spool rotatably journaled therein, said brake mechanism comprising, a friction face mounted for rotation with said line spool, a reaction pad mounted in said frame in juxtaposition to said friction face, said reaction pad being movable in a first direction to vary the pressure with which it engages said friction face, a film of fluid available between said friction face and said reaction pad, a gland mounted in said frame for movement in said first direction, resilient means interposed between said reaction pad and said gland to apply the selected pressure with which said reaction pad engages said friction face in response to engagement of said resilient means by said gland, a control knob movable in a second direction, a sliding connection securing said gland to said control knob, said sliding connection permitting movement of said gland in said first direction with respect to said control knob when said control knob is moved in said second direction, spring means having opposed ends, shoulder means fixedly located with respect to said frame, one end of said spring means engaging said gland and the other end engaging said shoulder means to bias said gland away from said resilient means.

2. A brake mechanism, as set forth in claim 1, in which movement in said first direction is axial movement and in which a duct means extends from said control knob axially through said gland to supply fluid for said film, said shoulder means being provided on said duct so that said spring means acts between said gland and said duct means to bias said gland away from said resilient means.

3. A brake mechanism, as set forth in claim 2, in which the control knob is mounted adjacent the frame for restricted movement in said first direction, movement of said control knob in said second direction being rotational movement about an axis extending outwardly of said frame, a plurality of detents in said control knob circumferentially spaced on a detent circle about the rotational axis thereof, plunger means carried on the frame for engagement with said detents to provide accurate, incremental rotation of said control knob.

4. A brake mechanism, as set forth in claim 3 in which the duct means terminates in a foot portion having an axially inner, radially oriented face through which the duct opens, said face being juxtaposed to a reservoir disc, a radially extending, axially inclined chamfer flaring axially outwardly from the radially outer extremity of the face on said foot portion in proximity to said resilient means.

UNITED STATES PATENT OFFICE
CERTIFICATE OF CORRECTION

Patent No. 3,549,103      Dated December 22, 1970

Inventor(s) Thomas F. Sarah

It is certified that error appears in the above-identified patent and that said Letters Patent are hereby corrected as shown below:

On the cover sheet [73], "Shakespeare Company, Kalamazoo, ich., a corporation of Delaware. by mesne assignment" should ead -- Shakespeare of Arkansas, Inc., Fayetteville, Ark., a orporation of Arkansas. by mesne assignment --. Column 1, line , "casing" should read -- casting --. Column 4, line 26, after gland" insert 51 --.

Signed and sealed this 15th day of June 1971.

SEAL)
ttest:

DWARD M. FLETCHER, JR.            WILLIAM E. SCHUYLER, JR.
ttesting Officer                    Commissioner of Patents

D-1050 (10-69)